(12) United States Patent
Rossetti et al.

(10) Patent No.: US 12,510,200 B2
(45) Date of Patent: Dec. 30, 2025

(54) HYDRAULIC CONNECTION GROUP WITH IMPROVED DECOMPRESSION SYSTEM

(71) Applicant: Faster S.r.l., Rivolta d'Adda (IT)

(72) Inventors: Daniele Rossetti, Pandino (IT); Sandro Ballotta, Peschiera Borromeo (IT); Federico Foletti, Agnadello (IT); Igor Polgati, Agnadello (IT); Paolo Rusconi, Rivolta d'Adda (IT)

( * ) Notice: Subject to any disclaimer, the term of this patent is extended or adjusted under 35 U.S.C. 154(b) by 40 days.

(21) Appl. No.: 18/721,854

(22) PCT Filed: Nov. 4, 2022

(86) PCT No.: PCT/IB2022/060631
§ 371 (c)(1),
(2) Date: Jun. 19, 2024

(87) PCT Pub. No.: WO2023/118993
PCT Pub. Date: Jun. 29, 2023

(65) Prior Publication Data
US 2024/0401735 A1    Dec. 5, 2024

(30) Foreign Application Priority Data
Dec. 21, 2021    (IT) .......................... 102021000032018

(51) Int. Cl.
*F16L 37/56*    (2006.01)
*F16L 55/07*    (2006.01)

(52) U.S. Cl.
CPC .............. *F16L 37/56* (2013.01); *F16L 55/07* (2013.01)

(58) Field of Classification Search
CPC .................................. F16L 37/56; F16L 55/07
See application file for complete search history.

(56) References Cited

U.S. PATENT DOCUMENTS

| | | | |
|---|---|---|---|
| 6,840,276 B2 * | 1/2005 | Zeiber | F16L 37/56 137/901 |
| 7,198,060 B2 * | 4/2007 | Hiser | F16K 27/003 137/509 |
| 8,567,436 B2 * | 10/2013 | Polgati | F16L 37/56 137/596.2 |
| 9,347,594 B2 * | 5/2016 | Rusconi | F16L 37/56 |
| 9,976,659 B2 * | 5/2018 | Preston | F16K 15/1823 |
| 10,197,201 B2 * | 2/2019 | Ferrara | F16L 37/42 |
| 10,408,239 B2 * | 9/2019 | Debernardi | F16L 55/07 |
| 10,938,137 B2 * | 3/2021 | Eriksson | F16L 37/56 |
| 2005/0247359 A1 | 11/2005 | Hiser | |
| 2016/0348799 A1 | 12/2016 | Preston | |
| 2022/0034436 A1 * | 2/2022 | Holst | F16L 37/56 |

FOREIGN PATENT DOCUMENTS

| | | | | |
|---|---|---|---|---|
| EP | 2378177 A1 * | 10/2011 | | F16L 37/56 |
| EP | 2054635 B1 * | 5/2013 | | F16L 39/00 |
| WO | 2004070241 | 8/2004 | | |

\* cited by examiner

*Primary Examiner* — David Colon-Morales
(74) *Attorney, Agent, or Firm* — Themis Law

(57) ABSTRACT

A hydraulic group for connecting the hydraulic circuit on board an operating machine to the hydraulic circuit of a utility with an improved decompression system includes a "pull" type decompression system, which it can be operated, by the pulling or the rotating and pulling by an operator of a shaped stem, a decompression cartridge, so that single couplings can be inserted into the manifold of the hydraulic group.

13 Claims, 6 Drawing Sheets

HYDRAULIC CONNECTION GROUP WITH IMPROVED DECOMPRESSION SYSTEM

FIELD OF THE INVENTION

The present invention relates to a hydraulic group for connecting the hydraulic circuit on board an operating machine to the hydraulic circuit of a utility with an improved decompression system.

The hydraulic group according to the present invention comprises a "pull" type decompression system, that is, it can be operated by the operator pulling the shaped stem of a decompression cartridge, so that single couplings can be inserted into the manifold of the hydraulic group.

State of the Art

Hydraulic groups suitable for connecting the hydraulic circuit on board an operating machine to the hydraulic circuit of movable hydraulic equipment, or utilities are known from the state of the art. An example of use of these hydraulic connection groups is that of earth-moving machines, such as excavators or the like, which are provided with an on-board hydraulic circuit for driving the parts of the machine, and normally have the possibility of connecting said on-board circuit to movable oleodynamic equipment, such as pneumatic drills, milling cutters and the like, to the hydraulic circuit on board the operating machine by means of flexible pipes and quick couplings.

When the hydraulic circuit of the utility is disconnected, it usually remains full of oil and this generates a condition of potential danger if, as is usually the case, the equipment is left in a construction site after use, often exposed to the sun or, in any case, to the action of elements that can cause an increase in the internal temperature and, consequently, in the pressure of the oil inside the hydraulic circuit of the equipment.

This increase in pressure in the utility, in addition to being dangerous in itself as it can damage the equipment itself, is also disadvantageous and therefore to be avoided because it greatly increases the force that the user must apply to reconnect the hydraulic lines of the tool to the machine to the point of sometimes making it insurmountable. In general, in fact, this connection is made by means of one or more quick couplings that require the operator to connect the male coupling of the utility line to the corresponding female coupling (cartridge) inserted in the hydraulic connection group or manifold provided on the machine, by means of a pressure movement in axial direction. The presence of pressurized fluid in the tool may therefore require a coupling force of several tens of kilograms, which prevents the user from establishing the connection.

For this reason, connection groups are known on the market that include decompression means on the lines to overcome these drawbacks.

An example of a hydraulic group comprising a plurality (typically two to four) female cartridges for connecting as many hydraulic lines is described in European Patent EP 2378177 B1 in the name of the same Applicant.

This hydraulic group is characterized in that it uses female hydraulic cartridges of the flat-faced type inserted into a group or manifold generally made of cast iron. The interaction of some components specifically provided on said female cartridges, and the internal surfaces of the seats of said cartridges obtained in the manifold, allows the lines to decompress and the oil to drain, thus lowering the pressure in the fluid.

However, this known solution has some drawbacks.

Among these drawbacks, it should be noted that, in some more burdensome working conditions and only with specific equipment, it has occurred that the system can go into self-compression causing a malfunction of the connection group.

The cause of this behaviour is due to the movement of the pipes during work which, with very high forces, can induce the cartridges to retract inside the block, thus activating the decompression system.

Solutions are also known, e.g. from EP 2054635 B1, which instead of the female cartridges envisage the use within the manifold of single couplings inside a hydraulic group provided with a decompression system which, however, allows to decompress only one line at a time.

SUMMARY OF THE INVENTION

In the light of the foregoing, the task of the present invention is to solve the drawbacks that afflict the hydraulic groups provided with a decompression system of a type known from the state of the art. Within this task, aim of the present invention is to provide a hydraulic connection group provided with an integrated decompression system that allows works for maintenance or replacement of the components to be carried out frontally, that is, without having to access the rear area of the manifold itself, which is difficult to access when the manifold is mounted on the operating machine.

Again, aim of the present invention is to provide a hydraulic connection group with integrated decompression system that can comprise three lines (two power and one drainage lines) or five lines (four power and one drainage lines).

Last but not least, aim of the present invention is to provide a hydraulic connection group with integrated decompression system that allows to use, in place of the cartridges, normal interchangeable flat-faced female couplings ISO 16028.

The task set out above, as well as the aforementioned purposes and others that will become clearer later, are achieved by a hydraulic connection group with integrated decompression system according to claim 1.

Other features of the hydraulic connection group with integrated decompression system according to the present invention are set forth in the dependent claims, which also form an integral part of the present disclosure.

LIST OF FIGURES

Further features and advantages will become clearer from the description of preferred, but not exclusive, embodiments of the multi-connection hydraulic group according to the present invention, illustrated by way of non-limiting example with the aid of the accompanying drawings in which.

Figure 4A:
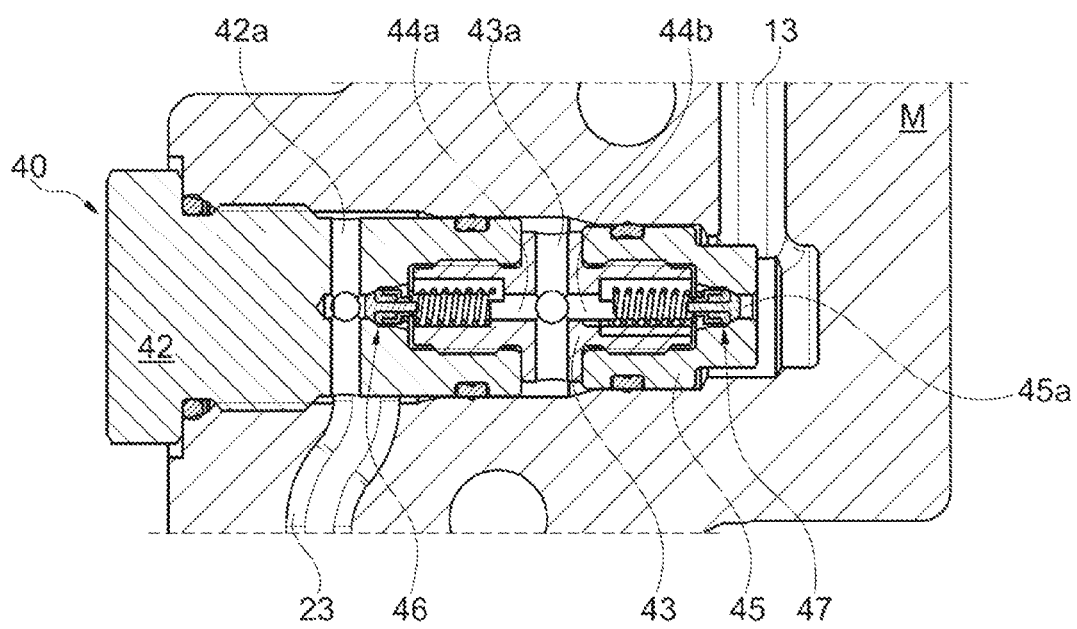
FIG. 4A shows a sectional side view of the shutting cartridge according to the present invention, part of the decompression system, in accordance with a first preferred embodiment.
Figure 4A:
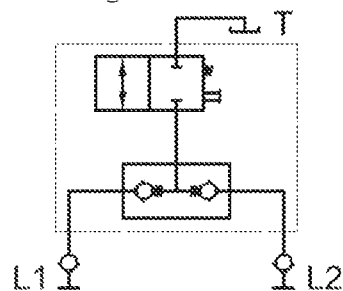
Figure 4B:
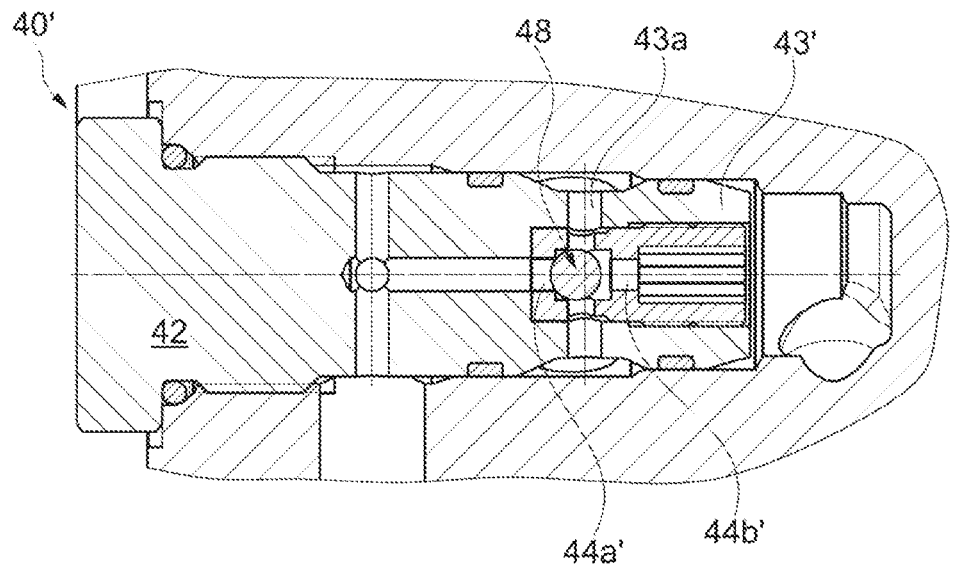
Figure 4B:
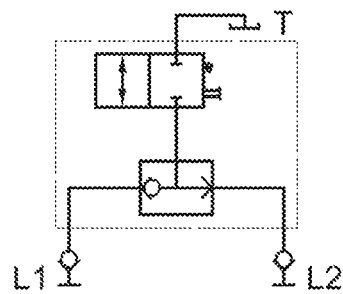
Figure 5:
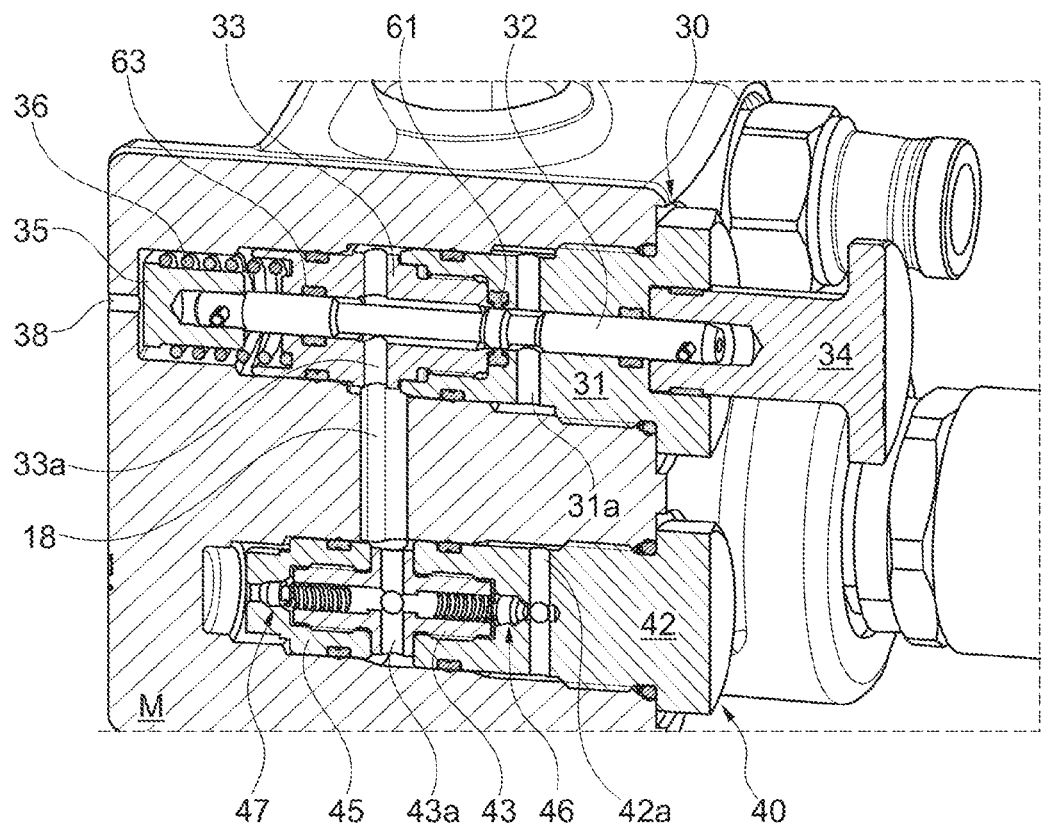
Figure 6:
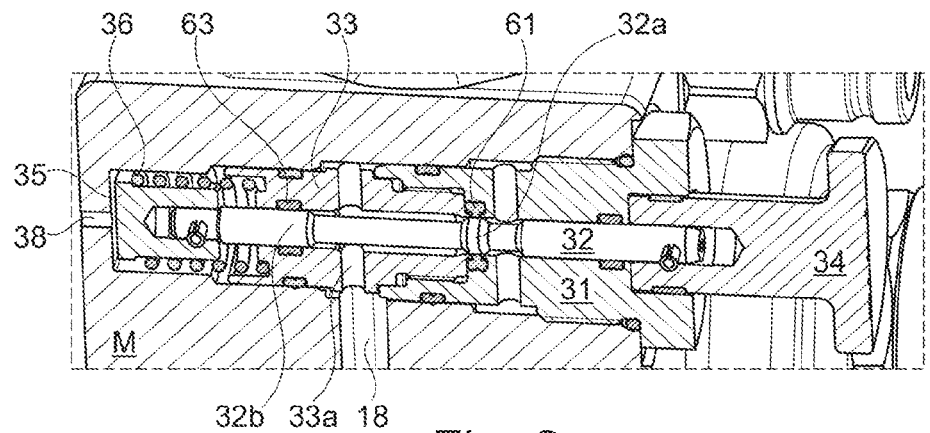
Figure 7:
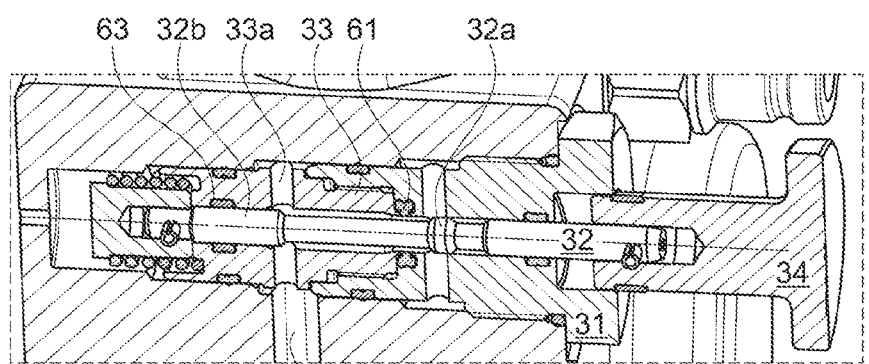
Figure 8:
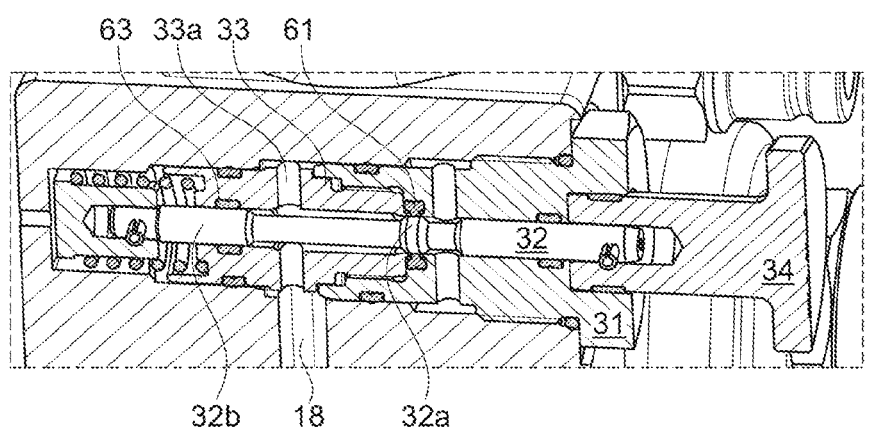
Figure 9A:
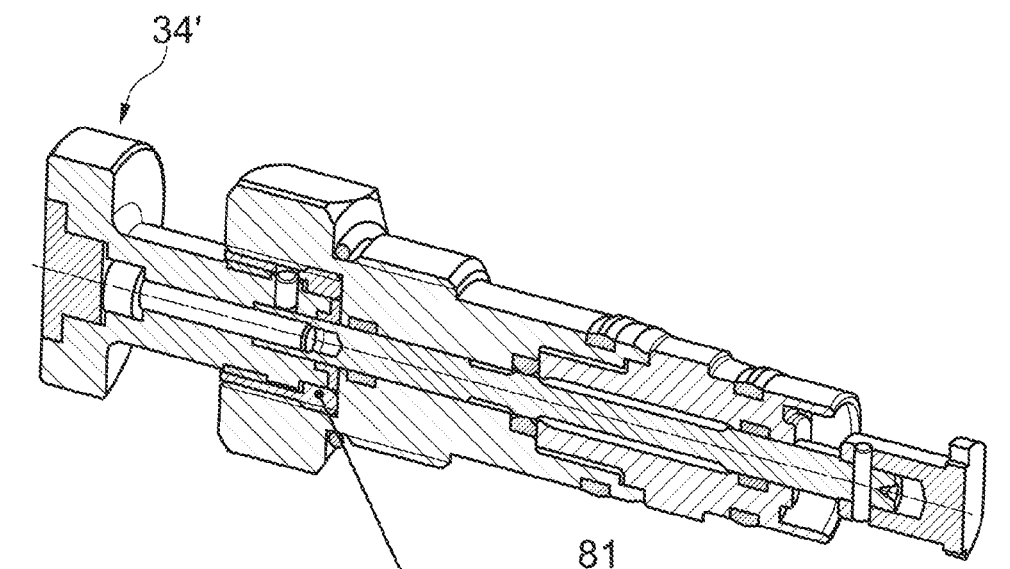
Figure 9C:
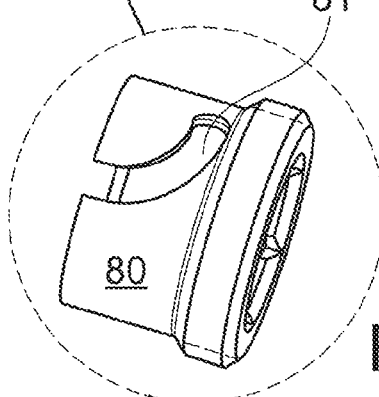
Figure 9B:
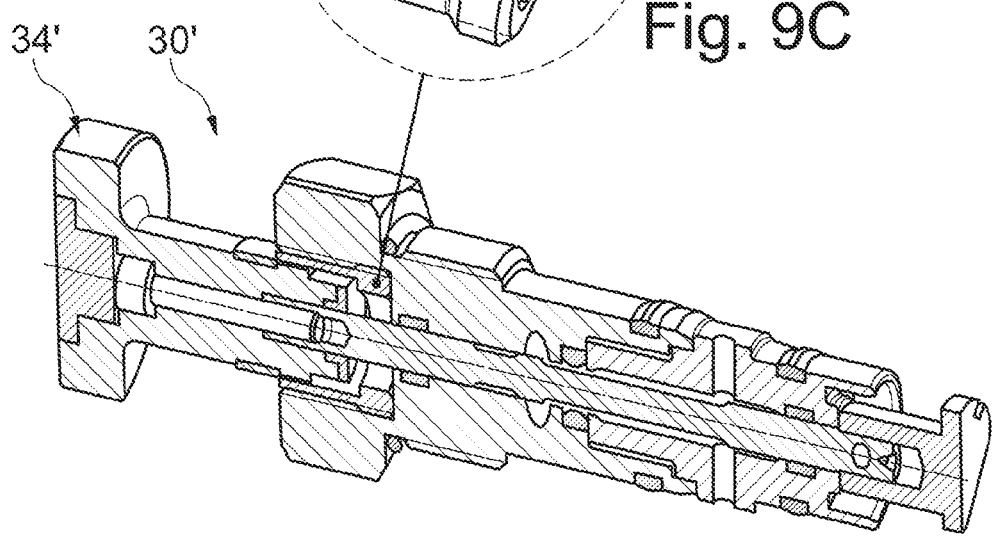

FIG. 4A' shows the hydraulic diagram of the system comprising the shutting valve according to the embodiment of FIG. 4A;

FIG. 4B shows a sectional side view of the shutting cartridge according to the present invention, part of the decompression system, in accordance with a second preferred embodiment;

FIG. 4B' shows the hydraulic diagram of the system comprising the shutting valve according to the embodiment of FIG. 4B;

FIG. 5 shows a partial sectional perspective view of the shutting cartridge and of the decompression cartridge according to the present invention;

FIGS. 6 to 8 show, in section, a view of the decompression cartridge according to the present invention in accordance with a first preferred embodiment respectively in the resting phase, in the extracted phase that allows the decompression of the system, and again in the resting phase;

FIGS. 9A, 9B show, in section, a view of the decompression cartridge according to the present invention in accordance with a second preferred embodiment respectively in the resting phase (FIG. 9A) and in the retracted decompression phase (FIG. 9B) which allows the decompression of the system; FIG. 9C shows a detail of a possible embodiment of a detail of the decompression cartridge of FIGS. 9A and 9B.

DETAILED DESCRIPTION OF THE INVENTION

With particular reference to the accompanying figures, the hydraulic connection group 1 according to the present invention is intended to be mounted on board an operating machine and allows the connection of several hydraulic power lines 10, 20 connected to the hydraulic circuit of said operating machine to the hydraulic lines of a utility by means of quick couplings 11, 21, in particular preferably by means of interchangeable standard flat-faced quick couplings ISO 16028. This feature naturally offers the advantage of allowing the user to use the new block according to the present invention with any equipment provided with standard male flat-faced couplings, ½" sized (half inch) but also of other sizes, being able to insert in the hydraulic group 1, in particular in the manifold or block or casting M, generally but not exclusively made of cast iron, female flat-faced couplings of any size, depending on the customer's needs.

The hydraulic connection group 1 according to the present invention is provided with an integrated decompression system 50, and comprises as mentioned a block or manifold M in which there are obtained several hydraulic power lines 10, 20 and suitable for receiving said quick couplings 11, 21.

Advantageously, in the three-line blocks there can be two flat-faced quick couplings (one female and one male) for the power lines and one or two drainage lines, as will be described below, while in the case of five-line blocks, there will be four quick couplings (two females and two males) for the power lines and again one or two drainage lines.

For both the castings with three lines and those with five lines, the solution can still be customised according to the customer's needs.

The hydraulic group 1 according to the invention is characterized in that said decompression system 50 is suitable for making a fluid connection between said hydraulic power lines 10, 20 and one or more drainage lines 60, 70.

Such drainage lines may advantageously comprise at least a first drainage line 60, suitably provided with a connection with a small quick coupling for example ⅜"-sized (three eighths of an inch) for the connection to the drainage line of the equipment, and a second drainage line 70 for draining the oil towards the oil tank on board the machine.

For the purpose of realising the fluid connection between said hydraulic power lines 10, 20 and one or more drainage lines 60, 70, the decompression system 50 according to the present invention comprises at least one "pull" type decompression cartridge 30, that is, operable by the user by means of a front grip knob 34 which can be grasped by the operator, which is in hydraulic connection with said hydraulic power lines 10, 20 through hydraulic connection lines 13, 23.

Furthermore, the decompression system 50 according to the present invention comprises a shutting cartridge 40, 40' able to selectively place in fluid communication, through an internal drainage line 18, each of said hydraulic connection lines 13, 23 with said decompression cartridge 30.

Figure 1:
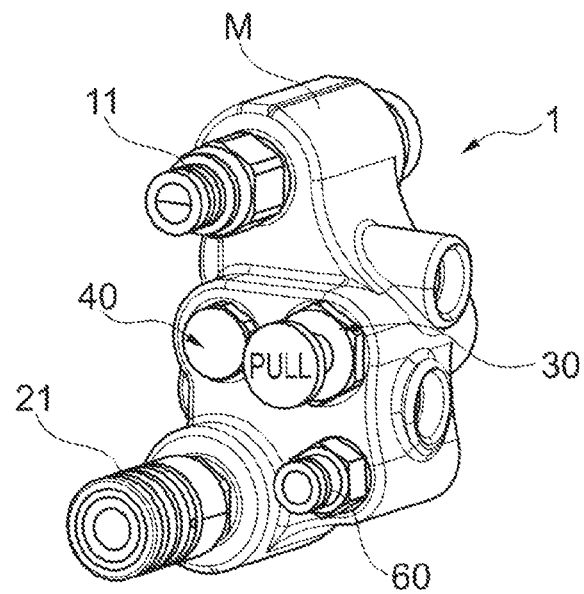
FIG. 1 shows an overall front perspective view of the connection hydraulic group in accordance with a preferred embodiment of the present invention.
Figure 2:
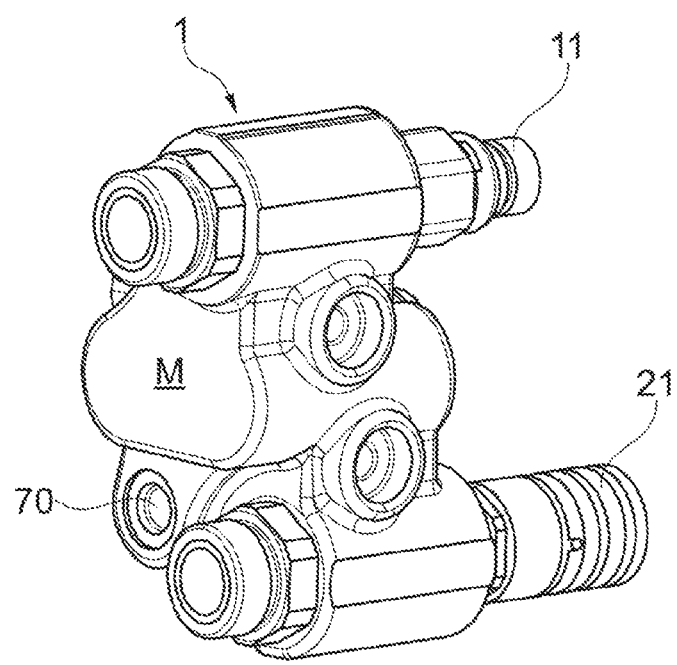
FIG. 2 shows a rear perspective view of the connection hydraulic group in accordance with a preferred embodiment of the present invention.
Figure 3:
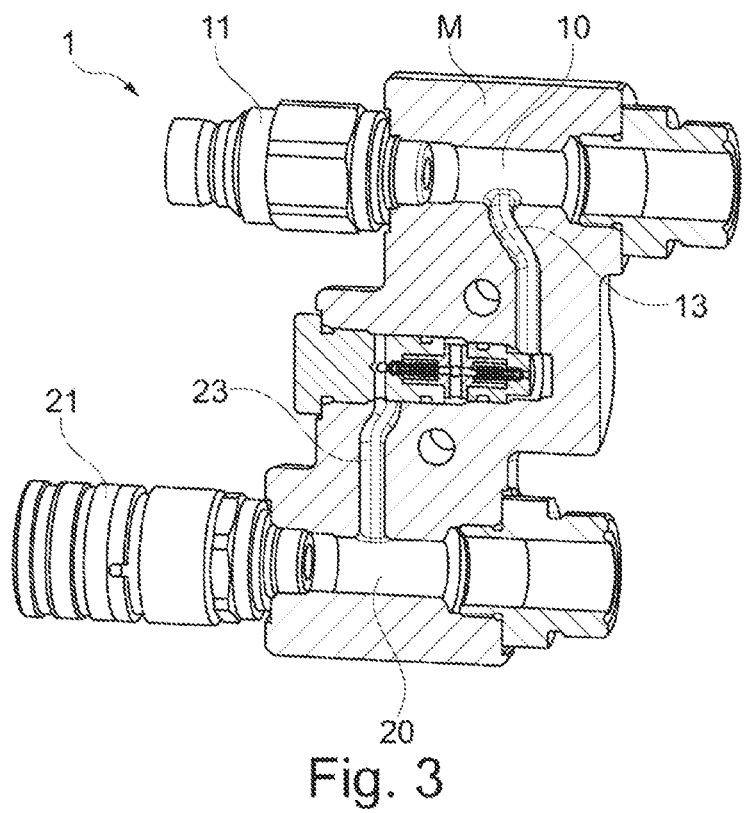
FIG. 3 shows a side view in partial section of the connection hydraulic group in accordance with a preferred embodiment of the present invention.

With reference, for example, to the accompanying FIG. 3, a hydraulic connection line 13 and 23 respectively branches off each hydraulic power line 10, 20.

The function of the shutting cartridge 40, 40' is to allow the passage of oil from the power line with higher pressure towards decompression, thus closing the oil passage of the power line with lower pressure and preventing the pressures within the lines themselves from "mixing" tending to balance.

More specifically, in accordance with a first preferred embodiment of the present invention shown in FIGS. 4A and 4A', said shutting cartridge 40 comprises a plurality of one-way valves 46, 47.

Advantageously, said shutting cartridge 40 comprises at least one front body 42 for fixing the cartridge within a corresponding seat provided in said manifold M and comprising at least one inlet hole 42a for the fluid coming from a first of said hydraulic connection lines 23, a central body 43 integrally associated with said front body 42, and a rear body 45 integrally associated with said central body 43 and in turn comprising at least one inlet hole 45a for the entry of the fluid coming from a second of said hydraulic connection lines 13.

The central body 43 in turn comprises at least one discharge channel 43a in fluid connection with said drainage line 43, and at least one collection channel 44a, 44b of the fluid coming from each of said hydraulic connection lines 13, 23. Said at least one collection channel 44a, 44b of the fluid is in turn in fluid connection with the discharge channel 43a provided on said central body 43.

The front body 42 advantageously comprises a first one-way valve 46 placed between said inlet hole 42a of the fluid coming from a first hydraulic connection line 23 and said collection channel 44a provided on the central body 43.

Similarly, the rear body 45 comprises a second one-way valve 47 placed between said inlet hole 45a of the fluid coming from a second hydraulic connection line 13 and said collection channel 44b provided on said central body 43.

To give an example of the problem that arises in the decompression phase, assuming that the power line 10 (the upper one in FIG. 3) is the one with the highest pressure (for example 10 MPa) and the power line 20 (the lower one in FIG. 3) has the lowest pressure (for example 5 MPa). In this case, the oil, in addition to flowing in one direction or the other, will tend to run along the hydraulic connection lines 13, 23 that connect the power lines 10, 20 with the shutting cartridge 40.

The shutting cartridge 40 is therefore composed of three bodies preferably obtained with a turning process: the front body 42, the rear body 45, and the central body 43.

The front body 42 allows the cartridge to be fixed, by means of a thread, in a seat designed to allow the oil passages and to contain the hydraulic seals. This component advantageously also houses the sealing O-Ring 42c that prevents the oil from leaking outwards, and contains the inlet hole 42a for the passage of oil coming from the line 20 and the seat of the one-way valve 46.

The central body 43 performs the function of guiding the one-way valves 46 and 47 in their opening movement (which results in the valves retracting in the direction of approach to the discharge channel 43a visible in FIG. 4) so as to ensure that the passage of the oil is not obstructed.

At this point the oil can flow towards the discharge channel 43a and through the internal drainage line 18, reach the decompression cartridge 30. With reference to FIG. 4, there may be two different pressurized zones:
  the zone indicated with A that is at the pressure of the line 20 (lower) contained in the sealing O-Ring 42c and the shaped polyurethane gasket 42d;
  the zone B with the pressure of the line 10 (higher) contained in the shaped polyurethane gasket 43d.

Since the pressure of the line 10 is higher, the valve 47 will open by letting oil pass towards the discharge channel 43a which through the internal drainage line 18 leads to the decompression cartridge 30.

Since the oil affects the entire collection channel 44a, 44b, the same pressure will also act on the valve 46 keeping it closed, and avoiding pressure balancing between the lines.

In accordance with a second preferred embodiment illustrated by way of example in FIG. 4B and in the diagram of FIG. 4B', the shutting cartridge 40' comprises a one-way ball seal valve, also commonly called a "shuttle valve".

With particular reference to FIG. 4B, the ball seal shutting cartridge 40' has the same structure as the shutting cartridge 40 with plurality of one-way valves 46, 47, in which the function of the two one-way valves 46, 47 is however performed by a sealing ball 48 suitable to abut against sharp-edged openings obtained within the central body 43' that houses the ball 48 and in which the collection channels 44a', 44b' of the fluid are obtained. As can be seen from the observation of FIG. 4B, the sealing ball 48 is adapted to abut against the sharp-edged mouth of the collection channels 44a', 44b' of the fluid. The sealing ball 48 abuts against the mouth of the collection channel opposite to that from which the fluid under pressure arrives, freeing the discharge channel 43a.

This second embodiment has the advantage of being particularly robust from the hydraulic point of view since the seal is guaranteed by the abutment of the sealing ball 48 against the mouth of the collection channels 44a', 44b' of the fluid.

It should be in fact emphasized that under normal conditions of use of the hydraulic group according to the present invention it is not uncommon to reach oil pressures within the hydraulic circuit of the order of 350 bar, with flow rates affecting the hydraulic group that can reach 160 litres/minute.

The sections of passage of the shutting cartridge 40, 40' in both embodiments shown herein are very small. To provide an exemplary indication, the diameter of the sealing ball 48 may be of the order of 3.5 mm, which as is understood owing to the reduced size of the passages leads to a flow rate concentration that results in a localized increase in fluid pressure and the occurrence of considerable stresses on the sealing elements of the entire system.

At a time when the decompression cartridge 30 is operated, by letting the oil flow towards the drainage line 70, the pressure of the power line 10 will drop until it is lower than that of the line 20, at which point the valve 46 will open and the valve 47 will close. This movement will occur until the pressure in the system is zeroed.

Decompression cartridge 30 operable by the user according to the present invention as visible in FIGS. 6 to 8, it comprises a front connection body 31 for fixing the cartridge within a corresponding seat provided in said main body, or manifold, M and comprises at least one drain hole 31a suitable for placing said decompression cartridge 30 in hydraulic connection with said drainage line 70, a front grip knob 34 which can be grasped by the operator to which a shaped stem 32 is integrally associated, advantageously by means of a plug or similar connection element. In accordance with a first preferred embodiment of the decompression cartridge 30 according to the present invention, the front grip knob 34 can be grasped by the user and movable in the axial direction. Said shaped stem 32 is therefore also axially movable as a consequence of the movement of said front grip knob 34.

In accordance with a second preferred embodiment of the present invention shown in FIGS. 9A, 9B and 9C, the decompression cartridge 30' comprises a front grip knob 34' which can be grasped by the operator and movable with a roto-translational movement, advantageously in that a guide bush 80 is provided which comprises a guide groove 81 advantageously configured according to a helical profile, as visible in FIG. 9C, or L-shaped or the like.

This enhances the safety of the system since for the decompression cartridge 30' to be operated the grip knob 34' must be pulled and rotated by the operator. Also in this case, the movement of said front grip knob 34' corresponds to a similar movement of the shaped stem 32.

The need to perform a rotational movement of the grip knob 34' to cause the stem 32 to translate helps to avoid the risk of inadvertent actuations of the decompression cartridge.

The decompression cartridge 30, 30' further comprises a rear conveyor body 33 comprising in turn at least one discharge channel 33a in fluid communication with said internal drainage line 18.

The decompression cartridge 30, 30' further comprises a rear bush 35 integrally associated with the shaped stem 32, able to define a limit switch for the movement of said shaped stem 32 and supporting a helical spring 36 which acts between the rear bush 35 and the rear conveyor body 33 bringing back said bush 35, and therefore the shaped stem 32 in position, when the operator releases said front grip knob 34.

Advantageously, between the external surface of said shaped stem 32 and the internal surface of said rear conveyor body 33 and of said front connection body 31 sealing elements 61, 62, 63 are provided which are adapted to selectively allow the fluid coming from said internal drainage channel 18 and that through said discharge channel 33a of said rear conveyor 33 to reach the drain hole 31a of the front connection body 31 only when the shaped stem 32 is moved axially towards the front part of the manifold M as a consequence of the pulling towards the outside of said knob front socket 34 by the user.

Advantageously, said sealing elements 61, 62, 63 consist of a polyurethane gasket.

Advantageously, said manifold M further comprises a hole 38 obtained in correspondence with the seat that accommodates said bush 35 and which communicates said decompression cartridge directly with the external environment in order to allow the passage of air.

With particular reference to FIGS. 6 to 9B, it is noted that by moving the central shaped stem 32, following a pulling movement of the front grip knob 34, the sealing areas of the stem indicated with A1 and A2 in FIG. 6 move, and which correspond to portions of the larger diameter portions 32a and 32b, with respect to the sealing gaskets 61 and 63, until the stem is in the extracted position visible in FIG. 7 in which the gaskets 61 and 63 no longer contact the larger diameter portions 32a and 32b, consequently leaving the passage for the oil free.

As can be seen, in this decompression position where the grip knob 34 and the stem 32 are in the extracted position, the sealing gaskets 61 and 63 no longer exert a fluid seal on the larger diameter portions 32a and 32b of the stem 32 and the oil can flow towards the internal drainage line 18, bringing the system pressure to zero.

In this condition it will be possible to connect and disconnect the quick couplings to connect the hydraulic lines without any problem.

Once the grip knob 34 is released, the entire system will return to the initial position, shown in FIG. 8, thanks to the rear helical spring 36 and will be ready to receive pressure again from the circuit of the operating machine.

Advantageously, as can be seen again in FIGS. 6 to 8, and in particular in FIG. 7, the grip knob 34 also acts as a seat for a coloured band 34a, preferably but not necessarily green, which has the function of visually warning the operator that the grip knob 34 has been correctly pulled until causing decompression, which has therefore occurred correctly. In fact, this visual warning device remains hidden by the front connection body 31 when the knob is normally closed and the system is in operation, and only becomes visible when the grip knob 34 is pulled all the way to the limit switch.

The same operation and the same movement of the internal components of the decompression cartridge 30' are visible with reference to FIGS. 9A and 9B.

It has thus been shown that the hydraulic connection group for connecting several hydraulic power lines by means of quick couplings and provided with an integrated decompression system according to the present invention allows to perform the task and achieve the purposes that the invention had set itself.

More particularly, it is understood from the description provided how the hydraulic connection group according to the present invention allows the decompression of the lines to be carried out manually so as to allow the connection of the couplings of the hydraulic lines without effort for the operator and in safe conditions.

The present invention has been described by way of a non-limiting illustrative example according to preferred embodiments thereof, however, it is understood that variations and/or modifications may be made by those skilled in the art, without thereby departing from the relative scope of protection, as defined in the accompanying claims.

The invention claimed is:

1. A hydraulic connection group (1) for connecting a plurality of hydraulic power lines (10, 20) using quick couplings (11, 21), comprising:

an integrated decompression system (50), including a manifold (M) in which there are obtained the plurality of hydraulic power lines (10, 20) and configured for receiving said quick couplings (11, 21), wherein said integrated decompression system (50) is configured for making a fluid connection between said plurality of hydraulic power lines (10, 20) and one or more drainage lines (60, 70) and comprises a decompression cartridge (30) that can be operated by a user and that is in hydraulic connection with said plurality of hydraulic power lines (10, 20) via hydraulic connection lines (13, 23), and a shutting cartridge (40, 40') configured to selectively place in fluid communication through an internal drainage line (18) each of said hydraulic connection lines (13, 23) with said decompression cartridge (30).

2. The hydraulic group (1) according to claim 1, wherein said shutting cartridge (40) comprises a plurality of one-way valves (46, 47).

3. The hydraulic group (1) according to claim 1, wherein said shutting cartridge (40') comprises a one-way valve with sealing ball (48).

4. The hydraulic group (1) according to claim 1, wherein said shutting cartridge (40, 40') comprises a front body (42) for fixing the shutting cartridge within a corresponding seat provided in a main body of the manifold (M), a first inlet hole (42a) for a fluid coming from a first one of said plurality of hydraulic connection lines (23), a central body (43, 43') integrally associated with said front body (42), and a rear body (45) integrally associated with said central body (43, 43') and comprising a second inlet hole (45 a) for the fluid coming from a second one of said plurality of hydraulic connection lines (13).

5. The hydraulic group (1) according to claim 4, wherein said shutting cartridge (40) comprises the central body (43) comprising a discharge channel (43a) in fluid connection with said drainage line (43), and a collection channel (44a, 44b) of the fluid coming from each of said plurality of hydraulic connection lines (13, 23) and in fluid connection with said discharge channel (43a) of said central body (43).

6. The hydraulic group (1) according to claim 5, wherein said front body (42) comprises a first one-way valve (46) placed between said inlet hole (42a) of the fluid coming from the first one of said plurality of hydraulic lines connection (23) and said collection channel (44a) provided on said central body (43), and wherein said rear body (45) comprises a second one-way valve (47) placed between said second inlet hole (45a) coming from the second one of said hydraulic connection lines (13) and said collection channel (44b) provided on said central body (43).

7. The hydraulic group (1) according to claim 1, wherein said decompression cartridge (30, 30') that can be operated by the user comprises a front connection body (31) for fixing the decompression cartridge within a corresponding seat provided in a main body of the manifold (M), a drain hole (31a) configured for placing said decompression cartridge (30, 30') in hydraulic connection with one of said one or more drainage lines (70), a front grip knob (34, 34') which can be grasped by the user and movable in an axial direction to which a shaped central stem (32) is integrally associated, said shaped central stem being axially movable as a consequence of a movement of said front grip knob (34, 34'), and a rear conveyor body (33) comprising a discharge channel (33a) in fluid communication with said internal drainage line (18).

8. The hydraulic group (1) according to claim 7, wherein said decompression cartridge (30') comprises the front grip knob (34') that can be gripped by the user and is movable with a combined movement of rotation and translation in the axial direction.

9. The hydraulic group (1) according to claim 8, wherein said decompression cartridge (30') comprises a guide bush (80) which comprises a guide groove (81) configured according to a helical or L-shaped profile.

10. The hydraulic group (1) according to claim 8, wherein said decompression cartridge (30, 30') comprises a rear bush (35) integrally associated with said shaped central stem (32), configured to define a limit switch for the movement of said shaped central stem (32) and supporting a helical spring (36) which acts between said rear bush (35) and said rear conveyor body (33) bringing back said bush (35), and said shaped central stem (32), in position when the user releases said front grip knob (34, 34').

11. The hydraulic group (1) according to claim 10, wherein, between an external surface of said shaped central stem (32) and an internal surface of said rear conveyor body (33) and an internal surface of said front connection body (31), sealing elements (61, 62, 63) are provided which are adapted to selectively allow the fluid coming from said internal drainage channel (18) and through said discharge channel (33a) of said rear conveyor body (33) to reach said drain hole (31a) of said front connection body (31) only when the shaped central stem (32) is moved axially towards a front part of the manifold (M) as a consequence of a pulling or a rotation and pulling towards an outside of said front grip knob (34, 34') by the user.

12. The hydraulic group (1) according to claim 11, wherein said manifold (M) comprises a hole (38) obtained in the manifold in correspondence with the seat that accommodates said rear bush (35) and which communicates said decompression cartridge directly with an external environment in order to enable a passage of air.

13. The hydraulic group (1) according to claim 1, wherein said one or more drainage lines (60, 70) comprise a first drainage line (60) equipped with a coupling for connection to a line drainage of a piece of equipment, and a second drainage line (70) for draining oil towards an oil tank present on board an operating machine.

* * * * *